(12) United States Patent
Overby

(10) Patent No.: US 8,862,091 B2
(45) Date of Patent: Oct. 14, 2014

(54) METHOD AND APPARATUS FOR GENERATING EMERGENCY ALERT NOTIFICATIONS ON MOBILE DEVICES

(75) Inventor: Mark Alan Overby, Bothell, WA (US)

(73) Assignee: Nvidia Corporation, Santa Clara, CA (US)

(*) Notice: Subject to any disclaimer, the term of this patent is extended or adjusted under 35 U.S.C. 154(b) by 0 days.

(21) Appl. No.: 13/594,708

(22) Filed: Aug. 24, 2012

(65) Prior Publication Data

US 2014/0057587 A1    Feb. 27, 2014

(51) Int. Cl.
*H04M 1/00*  (2006.01)
*H04B 1/38*  (2006.01)
*H01Q 11/12*  (2006.01)
*H04W 76/00*  (2009.01)
*H04W 4/22*  (2009.01)

(52) U.S. Cl.
CPC .............. *H04W 76/007* (2013.01); *H04W 4/22* (2013.01)
USPC ...................... 455/404.1; 455/575.1; 455/574; 455/127.5

(58) Field of Classification Search
USPC ........... 455/404.1, 404.2, 414.1, 550.1, 575.7
See application file for complete search history.

(56) References Cited

U.S. PATENT DOCUMENTS

| | | | |
|---|---|---|---|
| 2006/0271952 A1* | 11/2006 | Gurley et al. | 725/33 |
| 2007/0013591 A1* | 1/2007 | Ota et al. | 343/702 |
| 2010/0210248 A1* | 8/2010 | Morrissey et al. | 455/414.1 |
| 2010/0240339 A1* | 9/2010 | Diamond | 455/404.2 |

\* cited by examiner

*Primary Examiner* — Nizar Sivji

(57) ABSTRACT

An efficient method and apparatus to receive broadcasted emergency alerts using portable handheld devices or mobile devices that are operable to provide a user with relevant alerts based on the user's relevant position, in a low-powered, always-on manner are presented. Using the always on partitions of both the receiver and the system on chip (SOC) of a mobile device, embodiments of the present invention are capable of determining whether or not the remainder of the circuits of a mobile device need to be powered on in order to record audio data associated with an alert, when the alert is received. Furthermore, embodiments of the present invention are operable for displaying these alerts in a manner such that a user is notified that a relevant alert has been received and placing the user in a position where the user must address the alert notification and take appropriate action.

20 Claims, 10 Drawing Sheets

METHOD AND APPARATUS FOR GENERATING EMERGENCY ALERT NOTIFICATIONS ON MOBILE DEVICES

FIELD OF THE INVENTION

Embodiments of the present invention are generally related to the field of devices capable of receiving broadcasted emergency alerts pertaining to weather-related events or disaster scenarios.

BACKGROUND OF THE INVENTION

Traditionally, in the event of extreme weather or a disaster scenario, the NOAA Weather Radio service, or a similar agency, broadcasts emergency alert warnings over dedicated FM radio bands to notify residents of a particular geographical region of the impending threat. Using Same Area Message Encoding technology (SAME), these alerts are sent out as a digital set of information encoded for transmission over analog airwaves. The digital information prefixes the alert with pertinent details about the emergency, including information with regards to the type of emergency, the geographical areas affected by the emergency as well as the expected duration of the emergency.

This information may also be used to determine when audio data concerning the event and the regions affect will be broadcasted. Conventional radios designed specifically for these alerts are generally stationary devices that must always be powered on and tuned into a specific channel and wait for alerts that relate to a fixed geographical region. Furthermore, as these devices listen to every alert broadcasted over the FM radio band, they consume power unnecessarily. For radios that are portable, this conventional mode of operation further results in wasted battery life.

SUMMARY OF THE INVENTION

Accordingly, a need exists to address the problems discussed above. Embodiments of the present invention provide a novel solution to receive broadcasted emergency alerts using portable handheld devices or mobile devices that are operable to provide a user with relevant alerts based on the user's relevant position, in a low-powered, always-on manner. The user's relevant position may be the current position of the device or a pre-determined position set by the user.

As the prevalence of these devices increases, embodiments of the present invention provide an always-on model of being able to receive emergency notifications wherever the user may be located so that the user may take appropriate action. In addition to the basic reception capability, embodiments of the present invention also support the operation of these devices in a low-power, reliable manner such that the user need not be concerned with the normal high-power conditions associated with conventional radio technology that otherwise may make devices using electricity or wire-line technology non-functional in emergency conditions.

Furthermore, embodiments of the present invention allow alerts using the SAME protocol to be received, checked against a device's relevant position using location technologies such as GPS/WAAS, and then is either discarded or saved, depending on the user's preferences. After the SAME alert has been received, embodiments of the present invention can further automatically record any audio message from the source in such a fashion that the user can replay the message at an appropriate time if the user is not present when the alert is received or if the alert needs to be replayed for any other reason. This may be accomplished quickly using embodiments of the present invention, with the device returning to a low-power, always-on state, thus conserving battery life so that a device may perform other actions, such as monitoring further alerts.

Embodiments of the present invention are also unique in that, as technology exists today, no system exists to automatically detect and process governmental emergency notifications using a handheld mobile phone device using robust mechanisms that do not rely on specific cellular technology that may be potentially disrupted due to the conditions of the emergency. Furthermore, embodiments of the present invention are not susceptible to any carrier specific restrictions or technologies.

More specifically, in one embodiment, the present invention is implemented as a computer implemented method of generating a notification. The method includes detecting an emergency message from an FM radio band, where the detecting process is performed using a first radio circuit within a mobile device. In one embodiment of the present invention, the emergency message is a National Weather Service message. The method also includes determining if the message concerns a predetermined geographical region using a first portion of a computer system within the mobile device in response to the detecting process. In one embodiment of the present invention, the determining process also includes comparing a relevant location of the device to the predetermined geographical region as well as determining whether the relevant location of the device is in the predetermined geographical region.

Provided the message concerns the predetermined geographical region, the method also includes powering up a second radio circuit within the mobile device and powering up a second portion of the computer system. Also, the method includes receiving and decoding the emergency message using the second radio circuit, in which the emergency message comprises an audio signal. The method also includes storing the audio signal into a memory of the computer system. Furthermore, the method includes generating an alert notification concerning the emergency message on the mobile device.

In one embodiment of the present invention, the storing process and generating process are performed by the second portion of the computer system. In one embodiment of the present invention, the alert notification is a visual notification displayed on a display screen of the mobile device. In one embodiment of the present invention, the visual notification remains displayed on the display screen until a user interaction is performed in response to the visual notification. In one embodiment of the present invention, the alert notification is a visual notification displayed on a light emitting component of the mobile device. In one embodiment of the present invention, the visual notification remains displayed on said light emitting component until a user interaction is performed responsive to the visual notification.

In another embodiment, the present invention is directed toward a mobile device for generating a notification. The mobile device includes a plurality of radio circuits in which a first radio circuit is operable to detect an emergency message from an FM radio band. In one embodiment of the present invention, the emergency message is a National Weather Service message. The mobile device also includes a computer system, in which a first portion of the computer system is operable to make a determination if the message concerns a predetermined geographical region in response to a detection of the emergency message from the first radio circuit. In one embodiment of the present invention, the first portion of the computer system also includes a comparison module for comparing a relevant location of the mobile device to the predetermined geographical region, where the comparison module is coupled to a memory unit, as well as a determination module for determining whether the relevant location of the mobile device is in the predetermined geographical region, where the determination module is coupled to the memory unit.

Also, the mobile device includes a second radio circuit from the plurality of radio circuits, where the second circuit is operable to receive and decode the emergency message in which the emergency message comprises an audio signal. The mobile device also includes a wake-up circuit for powering up the second radio circuit and powering up a second portion of the computer system in response to the determination made by the first portion of the computer system. The mobile device also includes a memory of the computer system, where the memory is operable for storing the audio signal. The mobile device also includes a user alert module for generating an alert notification concerning the emergency message on the mobile device.

In one embodiment of the present invention, the user alert module comprises a display screen and the alert notification is a visual notification displayed on the display screen. In one embodiment of the present invention, the visual notification remains displayed on the display screen until a user interaction is performed in response to the visual notification. In one embodiment of the present invention the alert notification is a visual notification displayed on a light emitting component of the mobile device. In one embodiment of the present invention, the visual notification remains displayed on the light emitting component until a user interaction is performed in response to the visual notification.

In yet another embodiment, the present invention is directed toward another computer implemented method of generating a notification. The method includes detecting an emergency message from a radio band using a receiver operable to detect the signal within a mobile device and is coupled to a first receiver circuit. In one embodiment of the present invention, the emergency message is a National Weather Service message. The method also includes determining if the message concerns a predetermined geographical region using a user alert module coupled to a first portion of a computer system within the mobile device in response to the detecting process. In one embodiment of the present invention, the determining process also includes comparing a relevant location of the device to the predetermined geographical region as well as determining whether the relevant location of the device is in the predetermined geographical region.

Provided the message concerns said predetermined geographical region, the method also includes powering up a second radio circuit with the mobile device and a second portion of the computer system. The method also includes receiving and decoding the emergency message using the second radio circuit, where the emergency message comprises an audio signal. The method also includes storing the audio signal into a memory of the computer system. The method also includes generating an alert notification using the user alert module.

In one embodiment of the present invention the storing process and generating process are performed by the second portion of the computer system and where the radio band is an FM radio band. In one embodiment of the present invention, the alert notification is a visual notification displayed on a display screen of the mobile device. In one embodiment of the present invention, the visual notification remains displayed on the display screen until an action is performed in response to the visual notification. In one embodiment of the present invention, the alert notification is a visual notification displayed on a light emitting component of the mobile device. In one embodiment of the present invention, the visual notification remains displayed on the light emitting component until an action is performed in response to the visual notification.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIG. 5) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, an object, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Figure 1A:
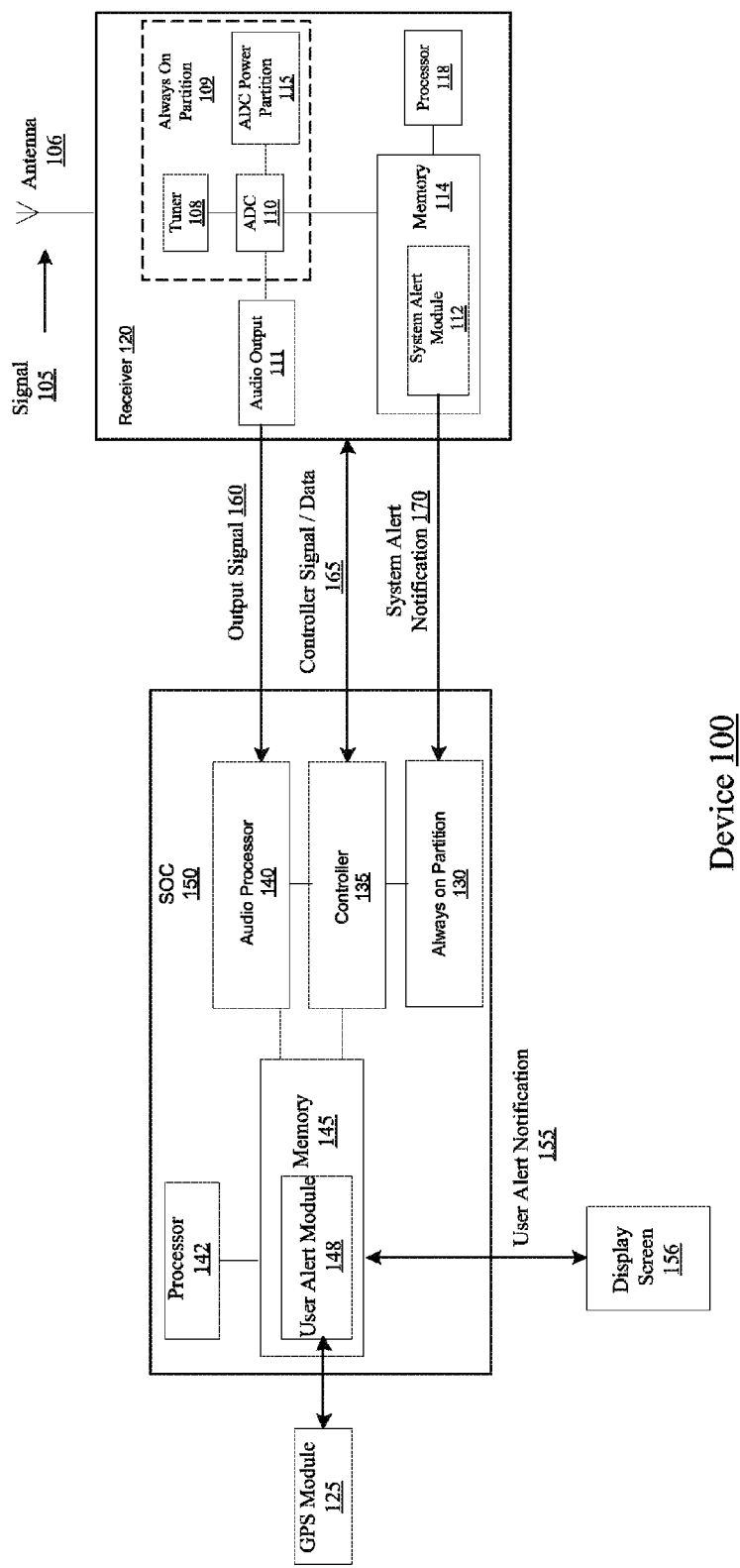
FIG. 1A depicts an exemplary electronic device upon which embodiments of the present invention may be implemented.

As presented in FIG. 1A, an exemplary device 100 upon which embodiments of the present invention may be implemented is depicted. Exemplary device 100 illustrates a digital representation of an embodiment of the present invention. Embodiments of the present invention may be implemented within a cellular phone, laptop, tablet personal computer or any electronic device capable of receiving signals distributed over FM frequencies.

Signal 105 may be broadcasted from a source such as the NOAA Weather Radio service, or similar agency. Furthermore, signal 105 may be in the form of a Specific Area Message Encoded (SAME) message providing weather-related emergency information transmitted over an FM band. SAME signals are encoded as a digital set of information data designed for transmission over an analog airwave. Signal 105 prefixes a weather alert, which generally includes a well-known event code format representing either a weather-related event or disaster scenario as well as location codes representing the locations that may be affected by the event. Furthermore, this signal may also be used to determine when audio data pertaining to the event will be broadcasted as well as alert frequency transmission information.

Receiver 120 receives signal 105 through tuner 108, which is coupled to antenna 106. Tuner 108 possesses the conventional capabilities to receive alert signals broadcasted over an FM band by a source providing emergency information to a number of geographic regions that may be potentially affected by a specific threat. In one embodiment of the present invention, tuner 108 outputs signal 105 to ADC 110, which converts signal 105 into a digital signal using known digital signal conversion processing techniques. Furthermore, tuner 108 and ADC 110 are coupled to ADC power partition 115. ADC power partition 115 is a component of receiver 120 that supplies power specifically to ADC 110. By coupling tuner 108 and ADC 110 to ADC power partition 115, these components form always on partition 109. These components operate in an "always on" mode in which they are operable to listen and detect signals for further processing by System Alert Module 112, while other components of receiver 120 operate in a low-powered mode or sleep state. According to one embodiment of the present invention, once signal 105 is received by ADC 110, System Alert Module 112 sends control signals in the form of a system alert notification 170 to the always on partition 130 of SOC 150. System alert notification 170 is designed to alert SOC 150 that signal 105 contains data that may be pertinent to the user and may require further processing by User Alert Module 148.

Always on partition 130 is a component of system on chip (SOC) 150 which functions in a similar manner as always on partition 109 in that it remains powered when other components of SOC 150 operate in a low-powered mode or sleep state. Always on partition 130 is coupled to controller 135, which is capable of waking up components within SOC 150 as well as receiver 120. Controller 135 may be removed from operating in a low-powered mode or sleep state by always on partition 130 upon receipt of system alert notification 170. Once removed from a possible sleep state, controller 135 communicates with SOC 150 as well as receiver 120 using control signals 165 sent through I²C bus using an I²C controller interface. Also, through control signals 165, the digitally prefixed information from signal 105 may be accessed by controller 135 for further processing by User Alert Module 148.

According to one embodiment of the present invention, User Alert Module 148, residing in memory 145, is activated through control signals sent by controller 135. User Alert Module 148 uses GPS module 125, which is a module that may be located internally within the device and is capable of either determining the coordinates of the device's position or using pre-determined coordinates specified by the user. Furthermore, GPS module 125 may utilize conventional global positioning system technology in calculating the device's position. If the coordinates are within the location codes specified in the signal 105, User Alert Module 148 instructs controller 135 to activate audio output 111 of receiver 120, via control signals 165, to enable tuner 108 and ADC 110 to receive any audio data associated with signal 105 that may be transmitted. Control signals 165 may also provide instructions for receiver 120 to begin transmission of the audio data associated with signal 105 from audio output 111 of receiver 120 into audio processor 140 of SOC 150. Audio processor 140 is compatible to receive I²C signals and is capable of providing or controlling any amplification functions required to process any audio data transmitted. The processed audio data is then stored in memory 145 for further processing by the User Alert Module 148.

Once the audio data is stored in memory 145, User Alert Module 148 sends a user alert notification 155 to display screen 156. User alert notification 155 is designed to notify the user that an alert deemed relevant to the user by User Alert Module 148 has been received and that there is associated audio data stored for playback. In one embodiment of the present invention, user alert notification 155 may be in the form of an alert message displayed on the display screen of a mobile device, which provides the user with a visual notification that an emergency alert has been received and that audio data is ready for playback. In another embodiment of the present invention, the user alert notification may be in the form of an illuminated LED display, which provides the user with a visual notification that an alert has been received and that audio data is ready for playback.

Figure 1B:
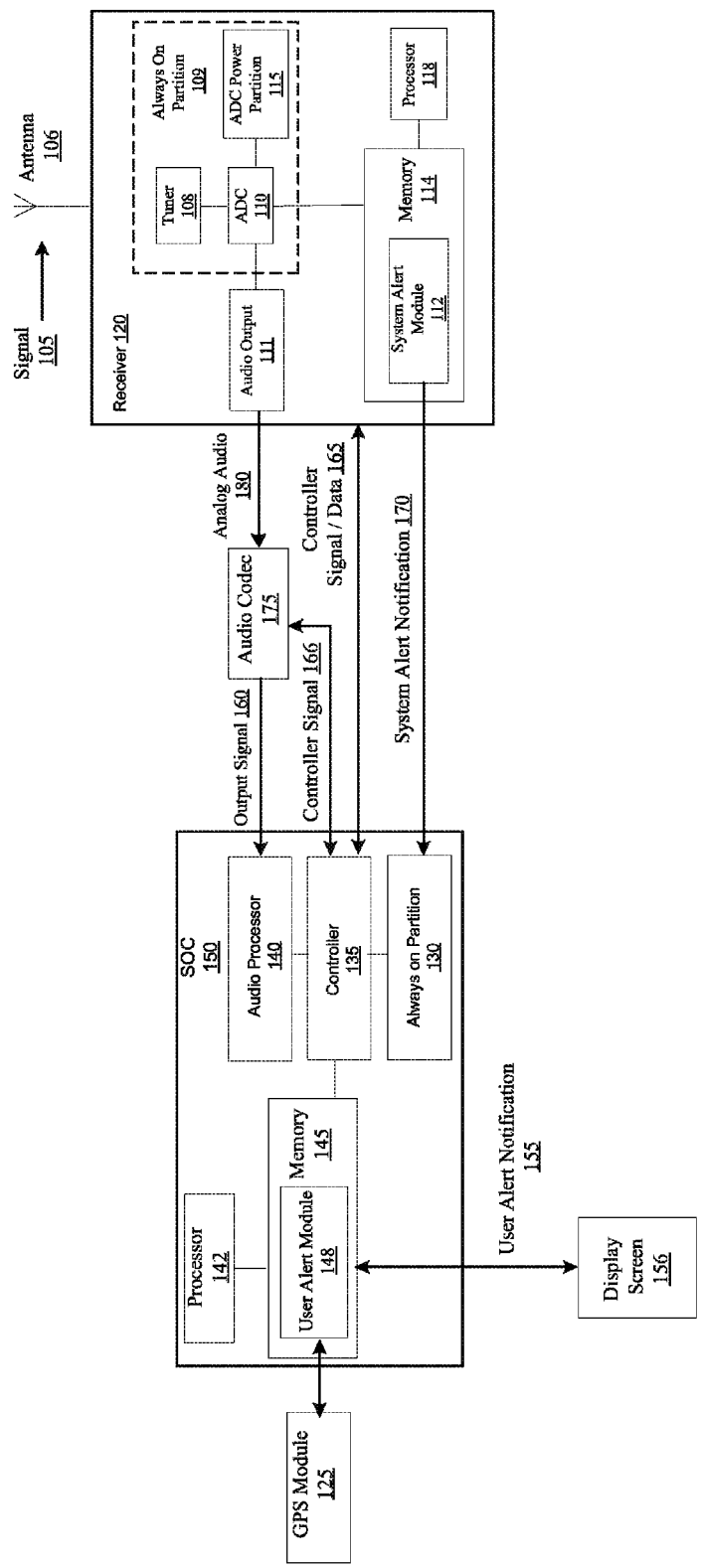
FIG. 1B depicts another exemplary electronic device upon which embodiments of the present invention may be implemented.

FIG. 1B, provides another exemplary device 100 upon which embodiments of the present invention may be implemented is depicted. Exemplary device 100 illustrates analog representation of an embodiment of the present invention.

Receiver 120 receives signal 105 through tuner 108, which is coupled to antenna 106. Tuner 108 possesses the conventional capabilities to receive alert signals broadcasted over an FM band by a source providing emergency information to a number of geographic regions that may be potentially affected by a specific threat. In one embodiment of the present invention, tuner 108 outputs signal 105 to ADC 110, which converts signal 105 into a digital signal using known digital signal conversion processing techniques. Furthermore, tuner 108 and ADC 110 are coupled to ADC power partition 115. ADC power partition 115 is a component of receiver 120 that supplies power specifically to ADC 110. By coupling tuner 108 and ADC 110 to ADC power partition 115, these components form always on partition 109. These components operate in an "always on" mode in which they are operable to listen and detect signals for further processing by System Alert Module 112, while other components of receiver 120 operate in a low-powered mode or sleep state. According to one embodiment of the present invention, once signal 105 is received by ADC 110, System Alert Module 112 sends control signals in the form of a system alert notification 170 to the always on partition 130 of SOC 150. System alert notification 170 is designed to alert SOC 150 that signal 105 contains data that may be pertinent to the user and may require further processing by User Alert Module 148.

Always on partition 130 is a component of system on chip (SOC) 150 which functions in a similar manner as always on partition 109 in that it remains powered when other components of SOC 150 operate in a low-powered mode or sleep state. Always on partition 130 is coupled to controller 135, which is capable of waking up components within SOC 150 as well as receiver 120. Controller 135 may be removed from operating in a low-powered mode or sleep state by always on partition 130 upon receipt of system alert notification 170. Once removed from a possible sleep state, controller 135 communicates with SOC 150 as well as receiver 120 using control signals 165 sent through I²C bus using an I²C controller interface. Also, through control signals 165, the digitally prefixed information from signal 105 may be accessed by controller 135 for further processing by User Alert Module 148.

According to one embodiment of the present invention, User Alert Module 148, residing in memory 145, is activated through control signals sent by controller 135. User Alert Module 148 uses GPS module 125, which is a module that may be located internally within the device and is capable of either determining the coordinates of the device's position or using pre-determined coordinates specified by the user. Furthermore, GPS module 125 may utilize conventional global positioning system technology in calculating the device's position. If the coordinates are within the location codes specified in the signal 105, User Alert Module 148 instructs controller 135 to activate audio output 111 of receiver 120, via control signals 165, to enable tuner 108 and ADC 110 to receive any audio data associated with signal 105 that may be transmitted. Control signals 165 may also provide instructions for receiver 120 to begin transmission of the audio data associated with signal 105 from audio output 111 of receiver 120 into audio processor 140 of SOC 150.

Additionally, controller 135 sends control signals 166 to audio codec 175 containing instructions to activate its internal ADCs to receive and process analog audio signal 180 from audio output 111. In one embodiment of the present invention, audio codec 175 possesses conventional encoding/decoding capabilities. Furthermore, signal 160 instructs audio codec 175 to push its output into audio processor 140 for further processing. Audio processor 140 is compatible to receive I²C signals and is capable of providing or controlling any amplification functions required to process any audio data transmitted. The processed audio data is then stored in memory 145 for further processing by the User Alert Module 148.

Once the audio data is stored in memory 145, User Alert Module 148 sends a user alert notification 155 to display screen 156. User alert notification 155 is designed to notify the user that an alert deemed relevant to the user by User Alert Module 148 has been received and that there is audio data stored for playback. In one embodiment of the present invention, user alert notification 155 may be in the form of an alert message displayed on the display screen of a mobile device, which provides the user with a visual notification that an emergency alert has been received and that audio data is ready for playback. In another embodiment of the present invention, the user alert notification may be in the form of an illuminated LED display, which provides the user with a visual notification that an alert has been received and that audio data is ready for playback.

Figure 1C:
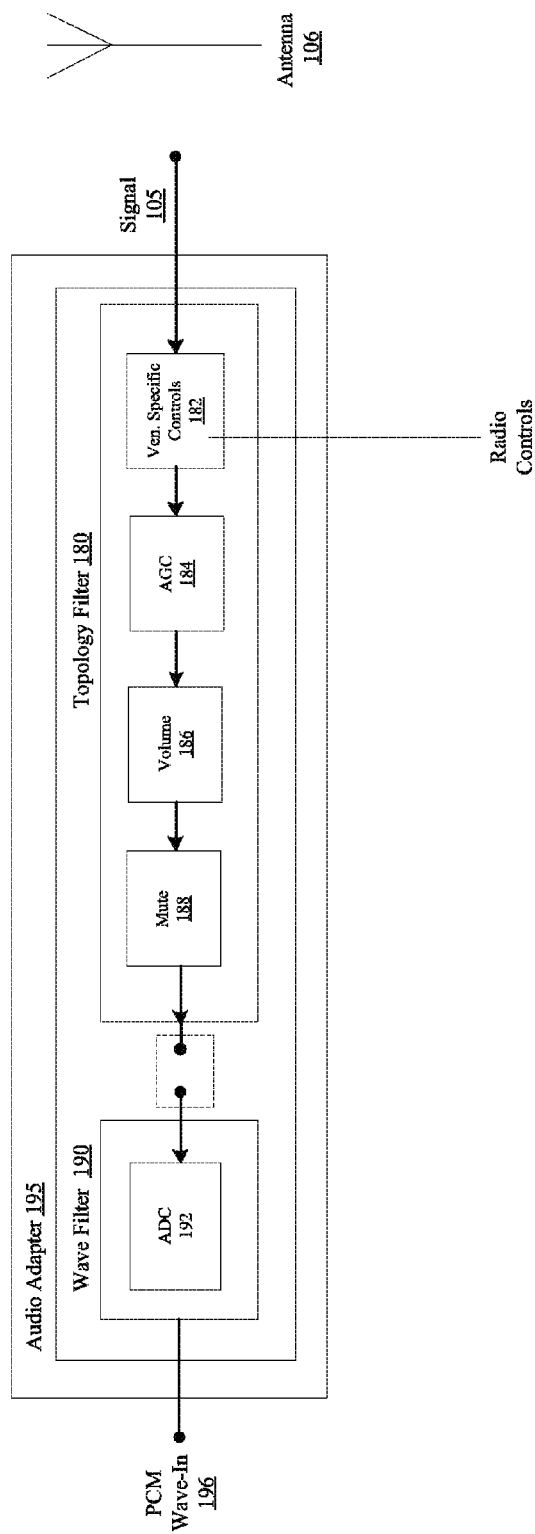
FIG. 1C depicts an exemplary flow diagram of an audio adaptation process in accordance with embodiments of the present invention.

FIG. 1C, provides an exemplary audio adaptation process that may be implemented using computer software in accordance with embodiments of the present invention.

In one embodiment of the present invention, audio adapter 195 may be used as a tool which enables receiver 120 to format incoming analog signal information. Audio adapter 195 may be comprised of two modules: a wave filtering module 190 and a topology filtering module 180. In one embodiment of the present invention, wave filtering module 190 may convert an analog signal into a digital signal 196 using audio codec 175 (see FIG. 1B). In another embodiment of the present invention, wave filtering module 190 converts an analog signal to a digital signal directly from within receiver 120 using audio output 111, which has the capabilities of converting the signal into digital form 196 (see FIG. 1A). According to embodiments of the present invention, ADC 110 may be configured using software to provide configuration details, signal conversion status information, as well as control information about the conversion process.

Topology filtering module 180 represents the internal topology of receiver 120 and how receiver 120 can be controlled as the audio data associated with a signal, such as signal 105, flows in from a source into the ADC conversion process and then into a host operating system. Nodes 182, 184, 186 and 188 are each different nodes within topology filtering module 180 that may be used to control receiver 120 and its output. According to one embodiment of the present invention, these nodes may exist in audio codec 175, receiver 120, or SOC 150. For example, in one embodiment of the present invention, AGC 184 (automatic gain control) may be located in SOC 150, while mute 188 may be implemented in either SOC 105 or codec 175. Furthermore, this provides a mechanism to control the formatting and output data of the audio stream. Vendor specific node 182 allows the software to present logic controls that an application, control panel, or other widget may use to control the tuning, configuration, or other necessary radio controls for the reception of the message data associated with signal 105.

Figure 2:
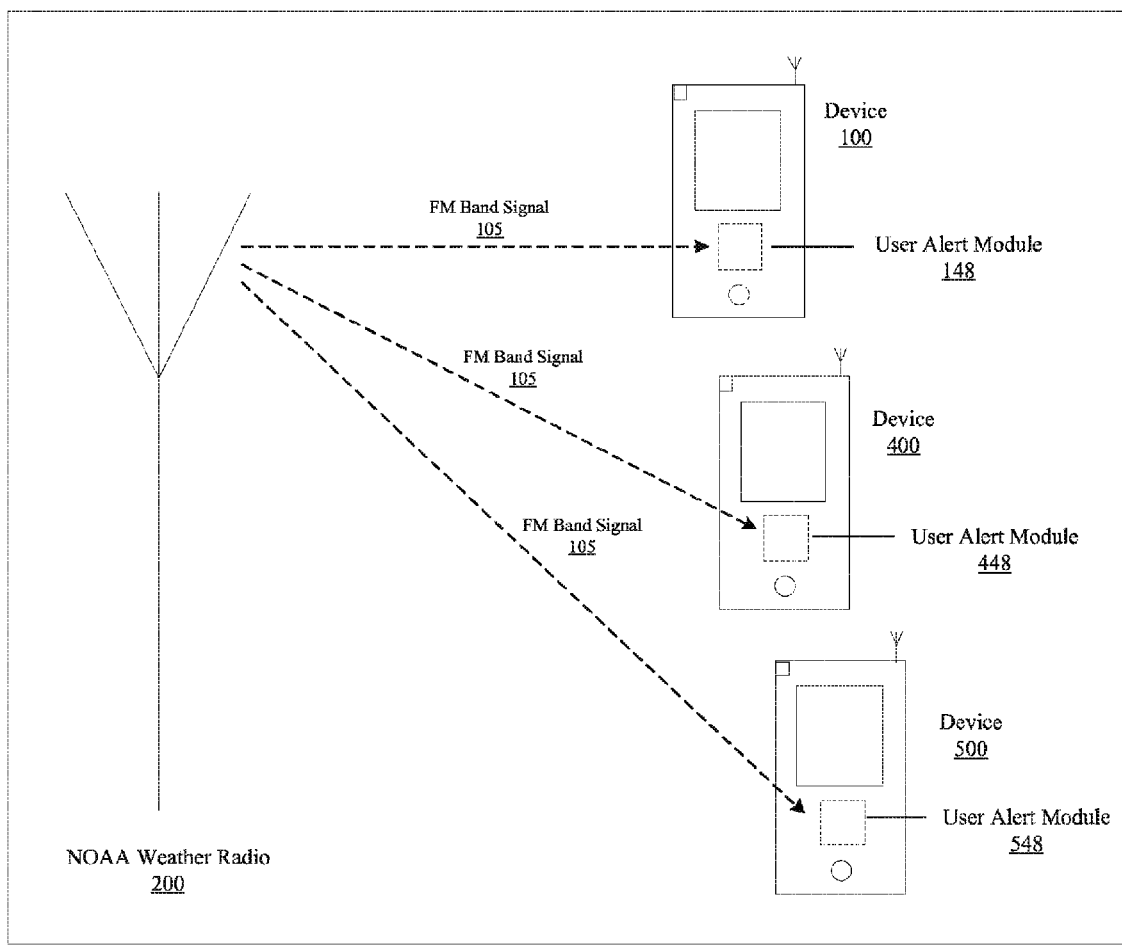
FIG. 2 is an illustration that depicts an exemplary method of receiving SAME signals in accordance with embodiments of the present invention.

FIG. 2, depicts a scenario in which emergency alerts are broadcasted and received in accordance with embodiments of the present invention.

FIG. 2 presents a scenario in which the NOAA Weather Radio service 200 broadcasts emergency alert signals over dedicated FM bands relating to an extreme weather or disaster scenario. Using Same Area Message Encoding technology, FM band signals 105 are sent out as a digital set of information encoded for transmission over analog airwaves. This digital set of information prefixes a weather alert, which generally includes an event code representing either a weather-related event or disaster scenario as well as location codes representing the locations that may be affected by the event. Furthermore, this signal may also be used to determine when audio data pertaining to the event will be broadcasted as well as alert frequency transmission information. Devices 100, 400 and 500 each receive the broadcasted FM band signals 105 through their respected receivers, where the signals undergo further processing by their respective User Alert Modules (User Alert Modules 148, 448 and 548).

Figure 3A:
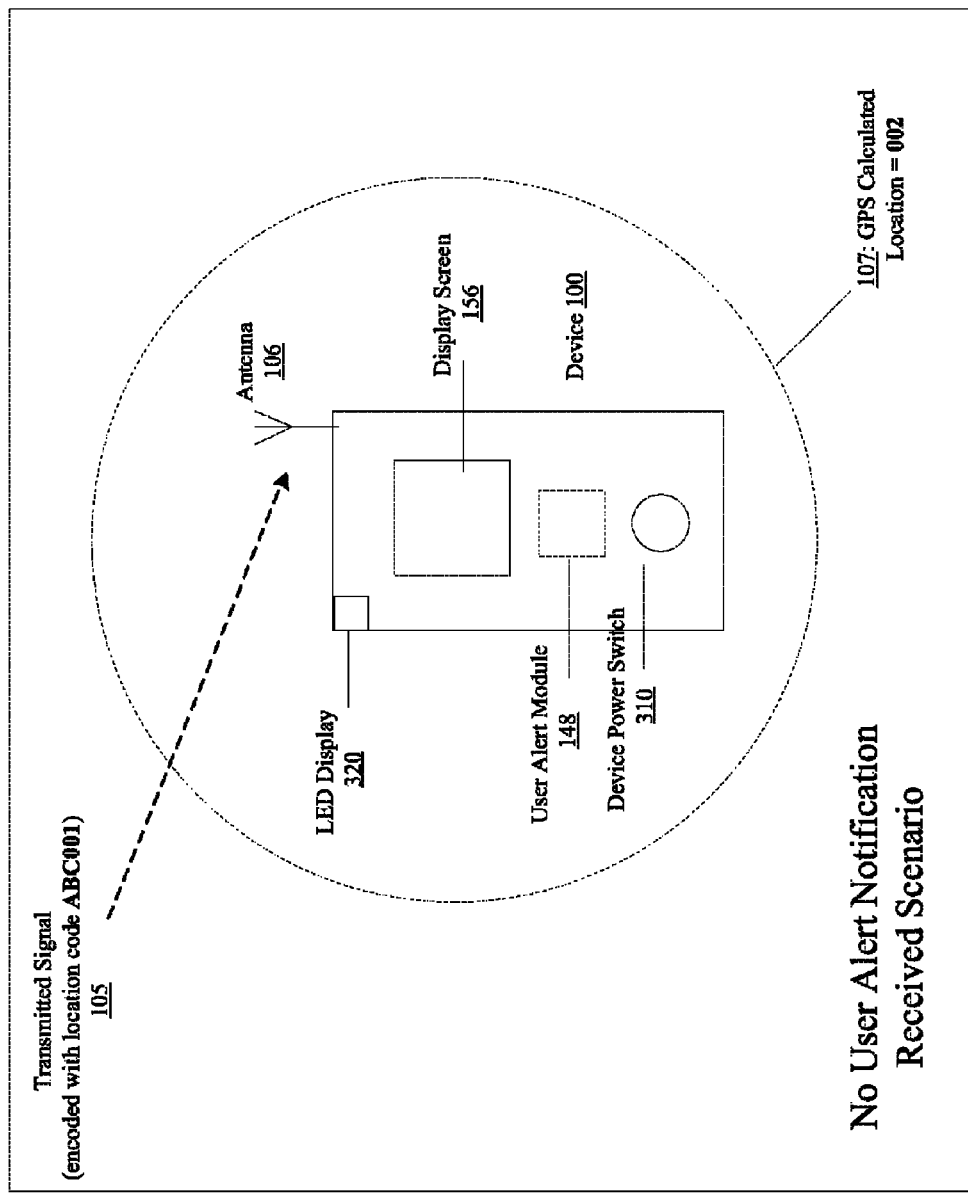
FIG. 3A is an illustration that depicts the display of an alert not relevant to a user in accordance with embodiments of the present invention.

FIG. 3A provides an exemplary scenario depicting how a user's GPS location impacts the user's ability to receive an emergency alert broadcasted by a source in accordance with embodiments of the present invention. Transmitted signal 105 represents a broadcasted emergency alert signal issued by the NOAA Weather Radio service. As illustrated in FIG. 3A, signal 105 contains a digital set of information encoded as "ABC001." The "ABC" segment of the signal may represent a weather-related event or a disaster scenario, such as a tornado or hurricane. The "001" segment of signal 105 represents the geographical region that is expected to be impacted by the event encoded as "ABC." Signal 105 is captured by the receiver of device 100 through antenna 106, where the signal will be further processed by User Alert Module 148. User Alert Module 148 receives signal 105 and compares the geographical region encoded in the signal to the relevant location of device 100, using device 100's built-in GPS system. Circular region 107 represents the calculated set of coordinates of device 100. As illustrated by FIG. 3A, the device is calculated to be in a position calculated as location "002." After determining that device 100 is not within encoded geographic region defined in signal 105, User Alert Module 148 will ignore the signal and device 100 will continue listening for other emergency alerts broadcasted over the FM band.

Figure 3B:
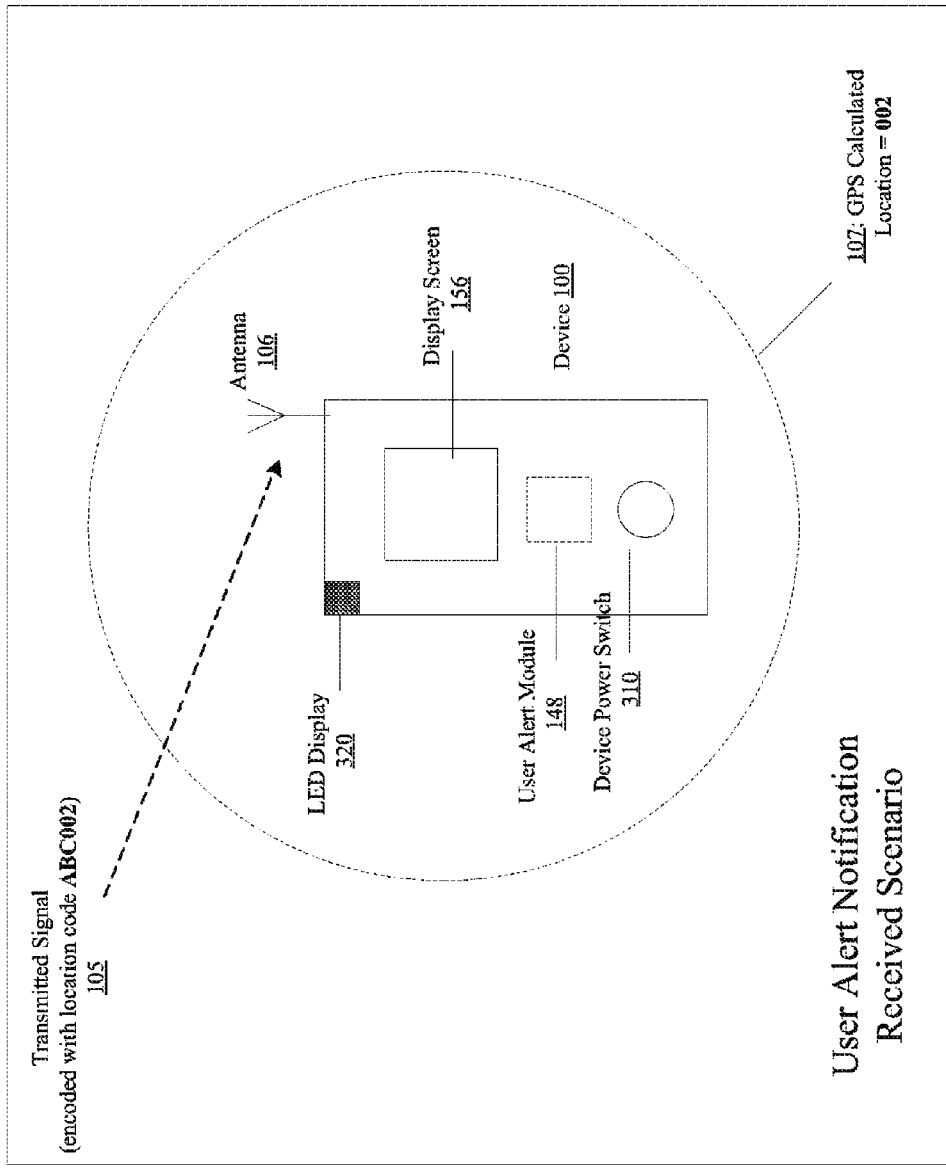
FIG. 3B is an illustration that depicts the display of an alert that is relevant to a user in accordance with embodiments of the present invention.

FIG. 3B provides another exemplary scenario depicting how a user's GPS location impacts the user's ability to receive an emergency alert broadcasted by a source in accordance with embodiments of the present invention. Transmitted signal 105 represents a broadcasted emergency alert signal issued by the NOAA Weather Radio service. As illustrated in FIG. 3B, signal 105 contains a digital set of information encoded as "ABC002." The "ABC" segment of the signal may represent a weather-related event or a disaster scenario, such as a tornado or hurricane. The "002" segment of signal 105 represents the geographical region that is expected to be impacted by the event encoded as "ABC." Signal 105 is captured by the receiver of device 100 through antenna 106, where the signal will be further processed by User Alert Module 148. User Alert Module 148 receives signal 105 and compares the geographical region encoded in the signal to the relevant location of device 100 using device 100's built-in GPS system. Circular region 107 represents the calculated set of coordinates of device 100. As illustrated by FIG. 3B, the device is calculated to be in a position calculated as location "002."

After determining that device 100 is within encoded geographic region defined in signal 105, text and audio data associated with signal 105 is processed and stored in memory 145 (See FIGS. 1A and 1B). Furthermore, the User Alert Module 148 will send a user alert notification 155. As illustrated in FIG. 3B, the user alert notification may be in the form of an illuminated LED display 320, which provides the user with a visual notification that an emergency alert pertaining to the user's relevant location has been received and that the audio is ready to be played. The user may access this data by powering device 100 on using device power switch 310. Embodiments of the present invention additionally support audio indicators in which a tone can be played indicating that an emergency alert has been received.

Figure 3C:
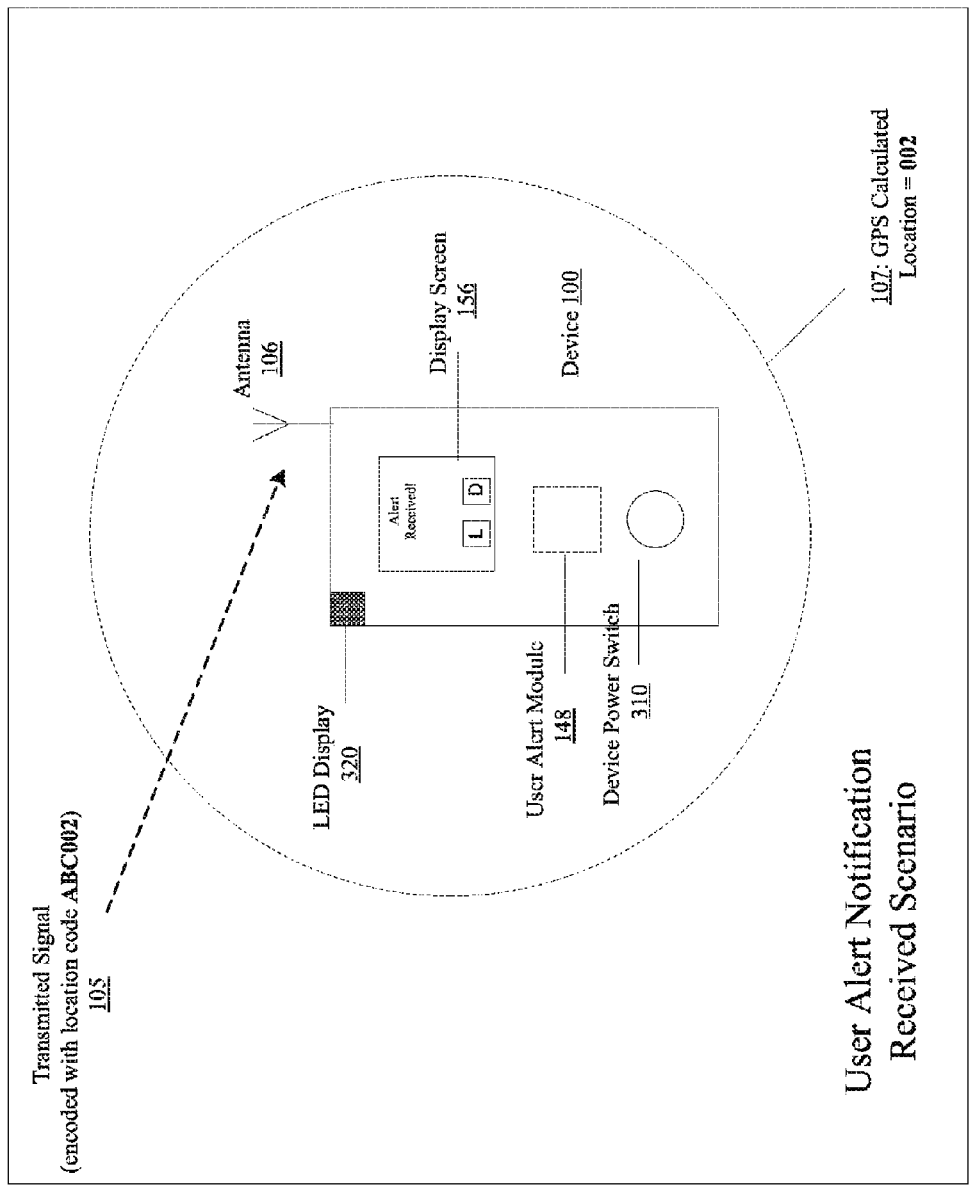
FIG. 3C is another illustration that depicts the display of an alert that is relevant to a user in accordance with embodiments of the present invention.

FIG. 3C provides yet another exemplary scenario depicting how a user's GPS location impacts the user's ability to receive an emergency alert broadcasted by a source in accordance with embodiments of the present invention. Furthermore, FIG. 3C depicts a scenario in which device 100 is powered on and fully operational. Transmitted signal 105 represents a broadcasted emergency alert signal issued by the NOAA Weather Radio service. As illustrated in FIG. 3C, signal 105 contains a digital set of information encoded as "ABC002." The "ABC" segment of the signal may represent a weather-related event or a disaster scenario, such as a tornado or hurricane. The "002" segment of signal 105 represents the geographical region that is expected to be impacted by the event encoded as "ABC." Signal 105 is captured by the receiver of device 100 through antenna 106, where the signal will be further processed by User Alert Module 148. User Alert Module 148 receives signal 105 and compares the geographical region encoded in the signal to the relevant location of device 100 using device 100's built-in GPS system. Circular region 107 represents the calculated set of coordinates of device 100. As illustrated by FIG. 3C, the device is calculated to be in a position calculated as location "002."

After determining that device 100 is within encoded geographic region defined in signal 105, text and audio data associated with signal 105 is processed and stored in memory 145. Furthermore, the User Alert Module 148 will send a user alert notification 155. As illustrated in FIG. 3C, the user alert notification may be in the form of an alert message displayed on display screen 156, which provides the user with a visual notification that an emergency alert has been received and that the audio is ready to be played. Embodiments of the present invention additionally support audio indicators in which a tone can be played indicating that an emergency alert has been received.

Figure 4:
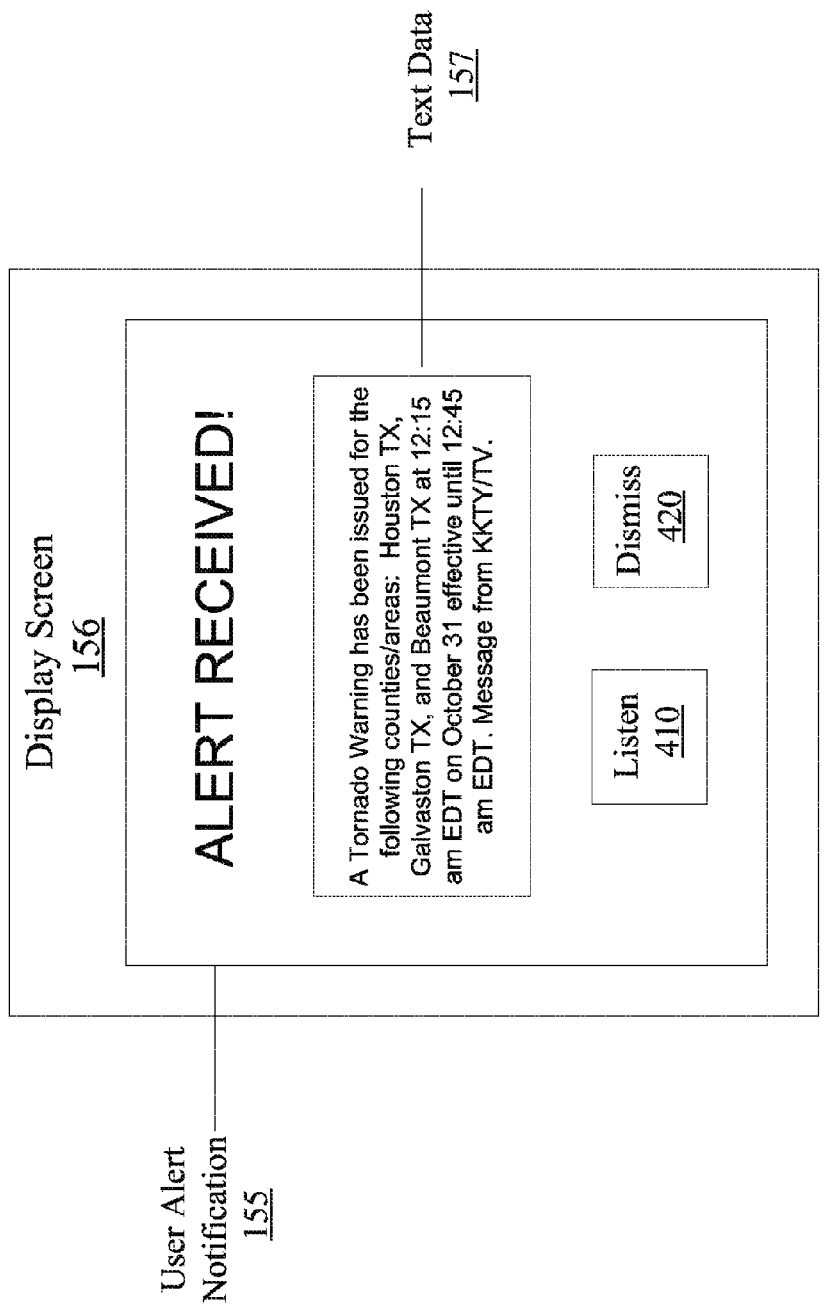
FIG. 4 is an illustration of a screen shot of the display screen when an alert is received in accordance with embodiments of the present invention.

FIG. 4 provides an exemplary visual notification that an emergency alert has been received in accordance with embodiments of the present invention. Once text and audio data from signal 105 is processed and then stored in memory 145, User Alert Module 148 will send user alert notification 155 on display screen 156. In one embodiment of the present invention, the user will be presented with the option to listen to the audio data by selecting the listen icon 410. Alternatively, the user may elect to ignore user alert notification 155 and select the dismiss icon 420, where the user is given the option to listen to the audio data at a later time. Also, the user alert notification 155 may display text data 157 encoded in signal 105 which may provide information regarding the event and geographical locations affected by the event. Furthermore, user alert notification 155 may remain displayed on the display screen until the user makes a selection. By maintaining this prompt on the display screen in this manner, the user is notified that there is an emergency alert that is relevant to the user. Thus, the user is placed in a position where the user must address the user alert notification and take the appropriate action based on the information presented.

Figure 5:
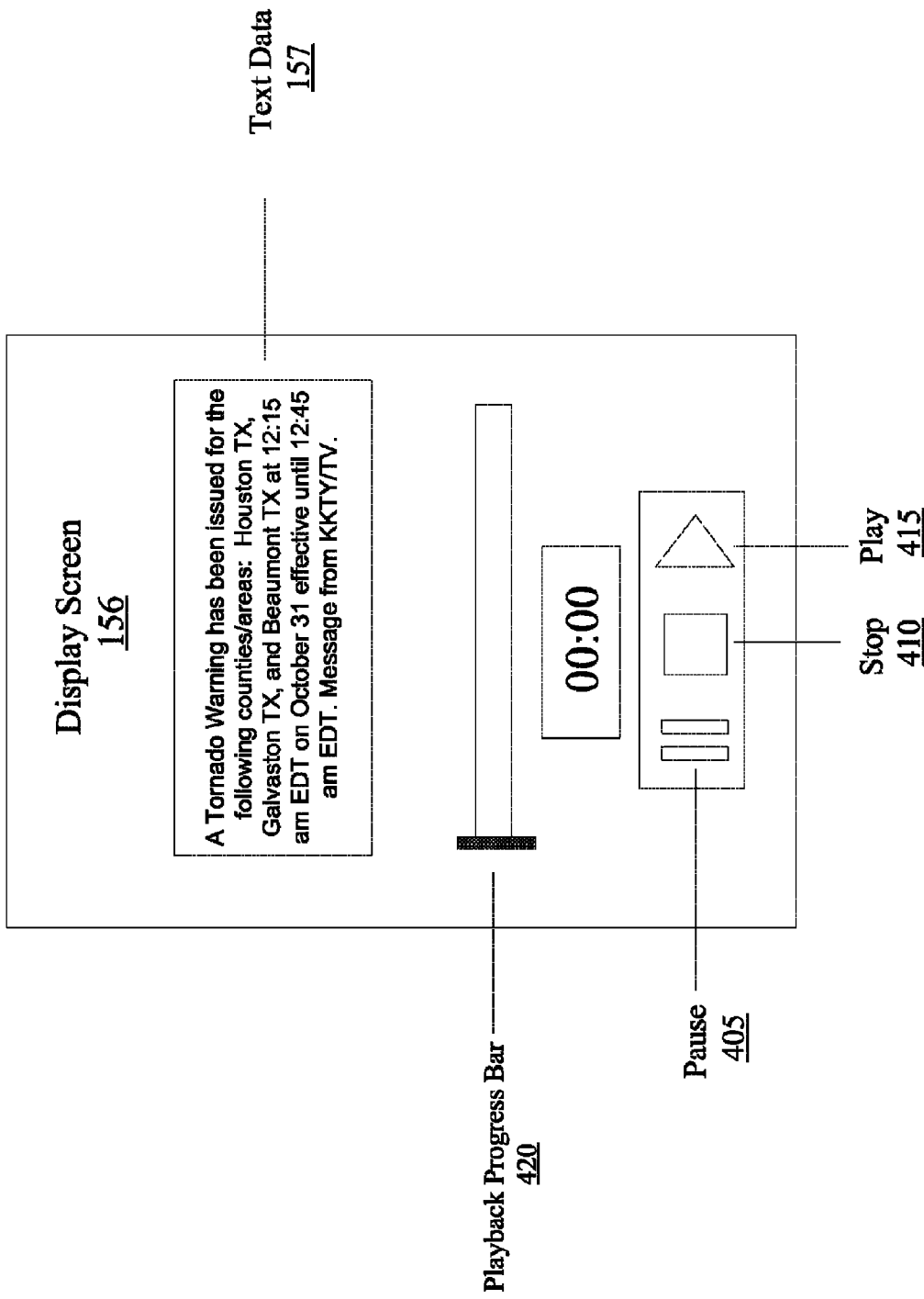
FIG. 5 is an illustration of a screen shot of the display screen when audio data associated with the alert is played in accordance with embodiments of the present invention.

FIG. 5 provides an exemplary display of the user's perspective when playing the audio data of an alert in accordance with embodiments of the present invention. As discussed earlier with regards to FIG. 4, embodiments of the present invention allow the user to be presented with the options to either listen to the audio data as soon as the alert notification is received or ignore the user alert notification. In one embodiment of the present invention, the user may play the audio data associated with signal 105. Using logic controls displayed on display screen 156, the user has the ability to use standard playback features, including the ability to pause the recording 405, stop the recording during playback 410 and resume playing the audio data using play icon 415. Furthermore, the user may manipulate the playback progress bar 420 to listen to specific portions of the audio data when the user elects to listen to the audio data. Additionally, display screen 156 may display the text data 157 encoded in signal 105 which may provide information concerning the event and geographical locations affected by the event.

Figure 6:
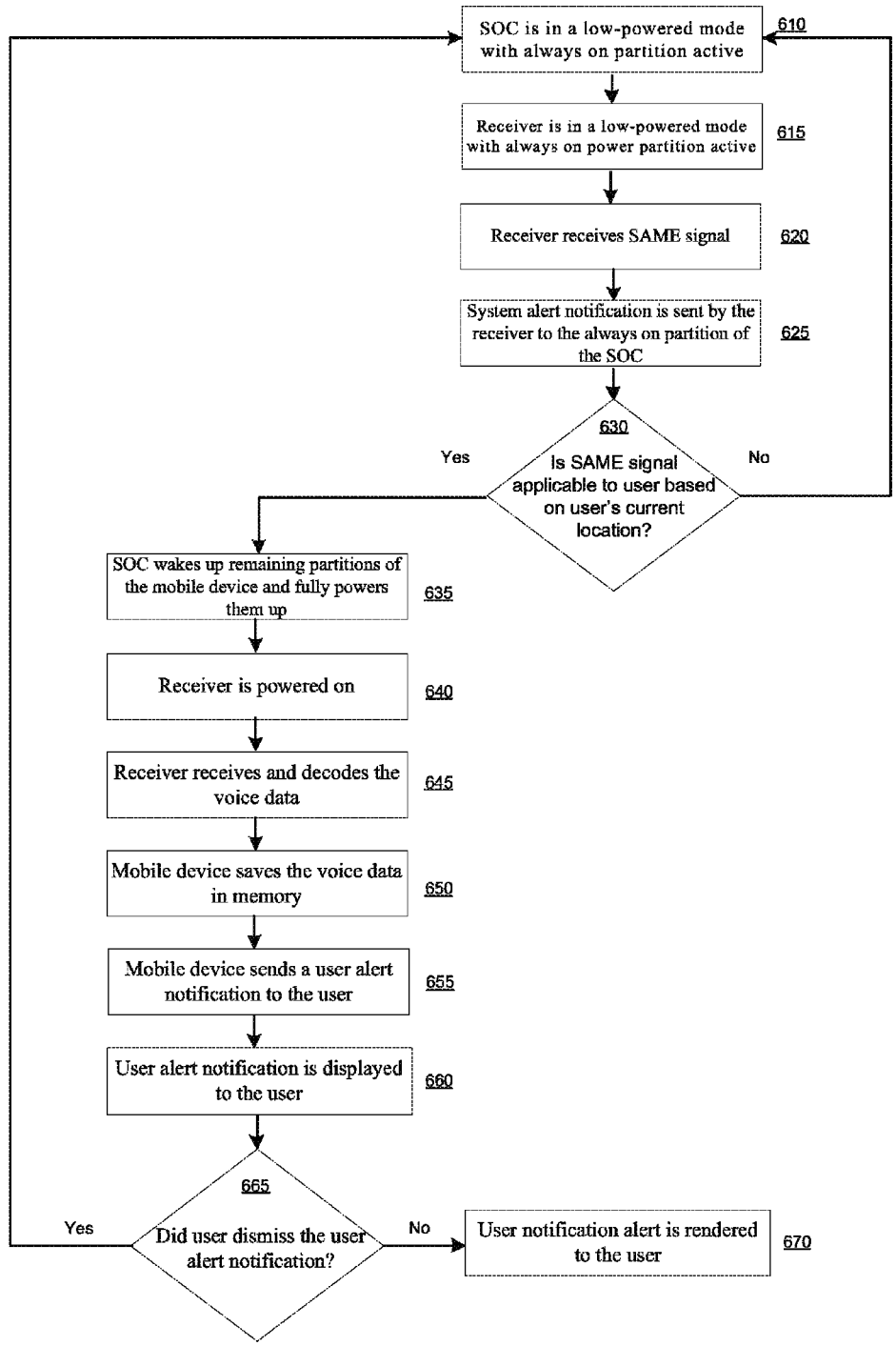
FIG. 6 depicts a flowchart of an exemplary alert notification process in accordance with embodiments of the present invention.

FIG. 6 shows a flowchart which describes exemplary steps in accordance with the various embodiments herein described.

At step 610, the SOC of the mobile device is in a low-powered mode or sleep state with its always on partition active.

At step 615, the receiver of the mobile device is in a low-powered mode or sleep state with an ADC power partition active. The ADC power partition is a component of the receiver that supplies power specifically to the ADC of the receiver. By coupling the tuner of the receiver and the ADC to the ADC power partition, these components form an "always on partition" of the receiver in which they are operable to listen and detect SAME signals for further processing.

At step 620, the receiver receives a SAME signal.

At step 625, a system alert notification is sent by the receiver to the always on partition of the SOC.

At step 630, a determination is made as to whether the SAME signal is applicable to the user based on the user's relevant location information. If the signal is applicable to the user, then the SOC wakes up the remaining partitions of the mobile device from their sleep state and fully powers them on, as detailed in step 635. If the signal is not applicable to the user, then the receiver of the mobile device remains in a low-powered mode with its always on partition active, as detailed in step 615.

At step 635, the SOC of the mobile device wakes up the remaining partitions of the mobile device from their sleep state and fully powers them on.

At step 640, the receiver is powered on.

At step 645, the receiver receives and decodes the voice data.

At step 650, the mobile device saves the voice data in memory.

At step 655, the mobile device sends a user alert notification to the user.

At step 660, the user alert notification is displayed to the user.

At step 665, a determination is made as to whether the user dismissed the user alert notification. If the user dismissed the user alert notification, then the mobile device remains in a low-powered mode or sleep state off with the always on partition active, as detailed in step 610. If the user did not dismiss the user alert notification, then the user notification alert is played to the user, as detailed in step 670.

At step 670, user notification alert is rendered to the user.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented method of generating a notification, said method comprising:

detecting an emergency message from an FM radio band, wherein said detecting is performed using a first radio circuit powered by a first power partition within a mobile device;

determining if said emergency message concerns a predetermined geographical region using a first portion of a computer system within said mobile device responsive to said detecting, herein said first portion is powered by said first power partition;

provided said emergency message concerns said predetermined geographical region, powering up a second radio circuit within said mobile device and powering up a second portion of said computer system, wherein said second radio circuit and said second portion are powered by a second power partition, wherein said second power partition is separate from said first power partition;

receiving and decoding said emergency message using said second radio circuit, wherein said emergency message comprises an audio signal;

storing said audio signal into a memory of said computer system producing a stored audio signal; and generating an alert notification concerning said emergency message on said mobile device, wherein said alert notification remains displayed on a display screen of said mobile device until a user interaction is performed, wherein said display screen comprises a graphical user interface configured to enable said user to selectively play a portion of said stored audio signal.

2. The method as described in claim 1 wherein said storing and said generating are performed by said second portion of said computer system.

3. The method as described in claim 1 wherein said emergency message is a National Weather Service message.

4. The method as described in claim 1 wherein said alert notification is a visual notification displayed on a light emitting component of said mobile device.

5. The method as described in claim 4 wherein said visual notification remains displayed on said light emitting component until a user interaction is performed responsive to said visual notification.

6. The method as described in claim 1, wherein said determining further comprises:

comparing a relevant location of said mobile device to said predetermined geographical region;

determining whether said relevant location of said mobile device is in said predetermined geographical region.

7. The method as described in claim 1, wherein said graphical user interface comprises a first display region operable to display a control panel to adjust playback of said stored audio signal.

8. The method as described in claim 7, wherein said graphical user interface comprises a second display region operable to display textual content associated with said alert notification.

9. The method as described in claim 8, wherein said first and second display regions are displayed contemporaneously.

10. A mobile device for generating a notification, said mobile device comprising:

a plurality of radio circuits, wherein a first radio circuit is operable to detect an emergency message from an FM radio band;

a computer system, wherein a first portion of said computer system is operable to make a determination if said emergency message concerns a predetermined geographical region responsive to a detection of said emergency message from said first radio circuit;

a second radio circuit from said plurality of radio circuits, wherein said second radio circuit is operable to receive and decode said emergency message wherein said emergency message comprises an audio signal;

a plurality of different wake-up circuits, wherein a first wake-up circuit from said plurality of wake-up circuits is operable to provide power to said second radio circuit and a second portion of said computer system responsive to said determination made by said first portion of said computer system, and wherein a second wake-up circuit from said plurality of wake-up circuits is operable to provide power to said first radio circuit and a first portion of said computer system;

a memory of said computer system, wherein said memory is operable to store said audio signal producing a stored audio signal; and a user alert module for generating an alert notification concerning said emergency message on said mobile device, wherein said alert notification remains displayed on a display screen of said mobile device until a user interaction is performed, wherein said display screen comprises a graphical user interface configured to enable said user to selectively play a portion of said stored audio signal.

11. The mobile device described in claim 10 wherein said emergency message is a National Weather Service message.

12. The mobile device described in claim 10 wherein said alert notification is a visual notification displayed on a light emitting component of said mobile device.

13. The mobile device described in claim 12 wherein said visual notification remains displayed on said light emitting component until a user interaction is performed responsive to said visual notification.

14. The mobile device described in claim 10, wherein said first portion of said computer system further comprises:
   a comparison module for comparing a relevant location of said mobile device to said predetermined geographical region, wherein said comparison module is coupled to said memory unit; and
   a determination module for determining whether said relevant location of said mobile device is in said predetermined geographical region, wherein said determination module is coupled to said memory unit.

15. A computer implemented method of generating a notification, said method comprising:
   detecting an emergency message from a radio band using a receiver, wherein said receiver is operable to detect a signal within a mobile device and said receiver is powered by a first power partition;
   determining if said emergency message concerns a predetermined geographical region using a user alert module coupled to a first portion of a computer system within said mobile device responsive to said detecting, wherein said first portion is powered by said first power partition;
   provided said emergency message concerns said predetermined geographical region, powering up a second radio circuit within said mobile device and a second portion of said computer system, wherein said second portion is powered by a second power partition, wherein said second power partition is separate from said first power partition;
   receiving and decoding said emergency message using said second radio circuit, wherein said emergency message comprises an audio signal;
   storing said audio signal into a memory of said computer system producing a stored audio signal; and
   generating an alert notification using said user alert module, wherein said alert notification remains displayed on a display screen of said mobile device until a user interaction is performed, wherein said display screen comprises a graphical user interface configured to enable said user to selectively play a portion of said stored audio signal.

16. The method as described in claim 15 wherein said storing and said generating are performed by said second portion of said computer system and wherein said radio band is an FM radio band.

17. The method as described in claim 15 wherein said emergency message is a National Weather Service message.

18. The method as described in claim 15 wherein said alert notification is a visual notification displayed on a light emitting component of said mobile device.

19. The method as described in claim 18 wherein said visual notification remains displayed on said light emitting component until a user interaction is performed responsive to said visual notification.

20. The method as described in claim 15, wherein said determining further comprises:
   comparing a relevant location of said mobile device to said predetermined geographical region;
   determining whether said relevant location of said mobile device is in said predetermined geographical region.

* * * * *